W. W. KEMP AND W. H. VAN HORN.
APPARATUS FOR AND METHOD OF HEATING METAL.
APPLICATION FILED JUNE 19, 1918.
1,404,615.
Patented Jan. 24, 1922.
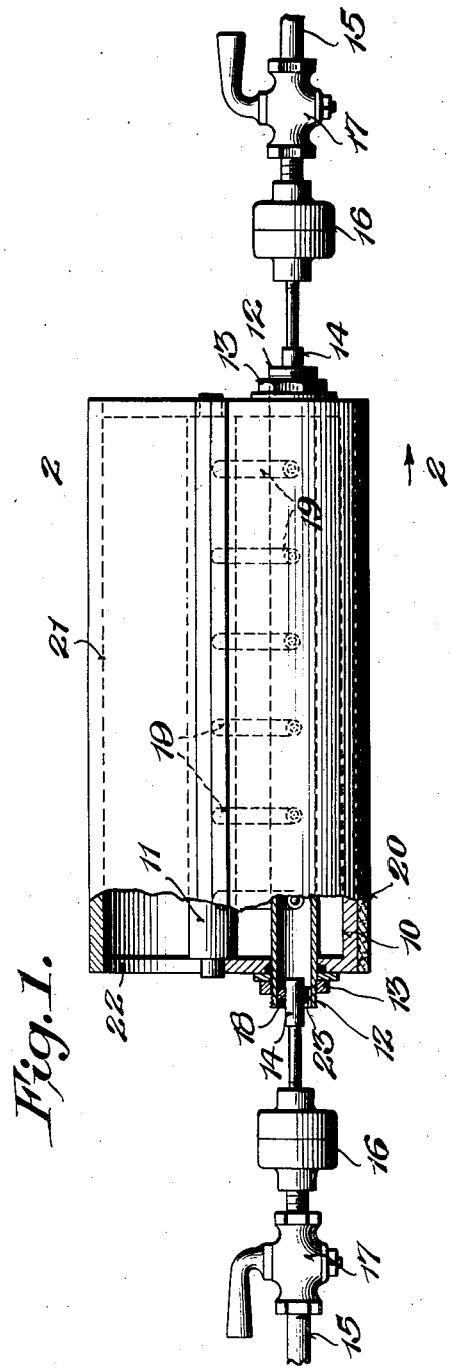
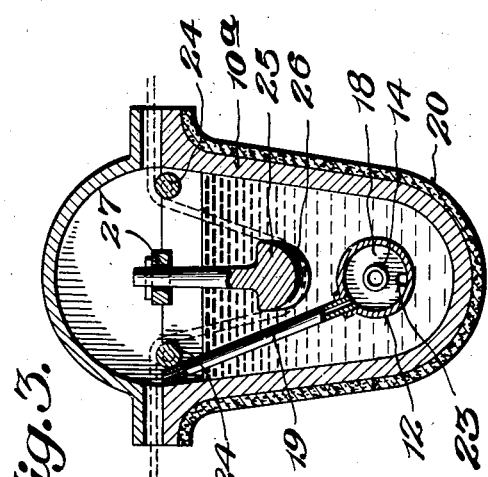
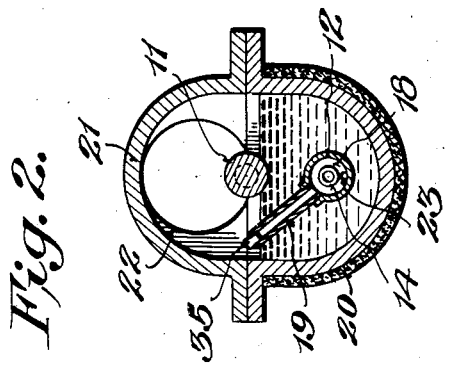
Inventors
W. W. Kemp,
W. H. Van Horn,

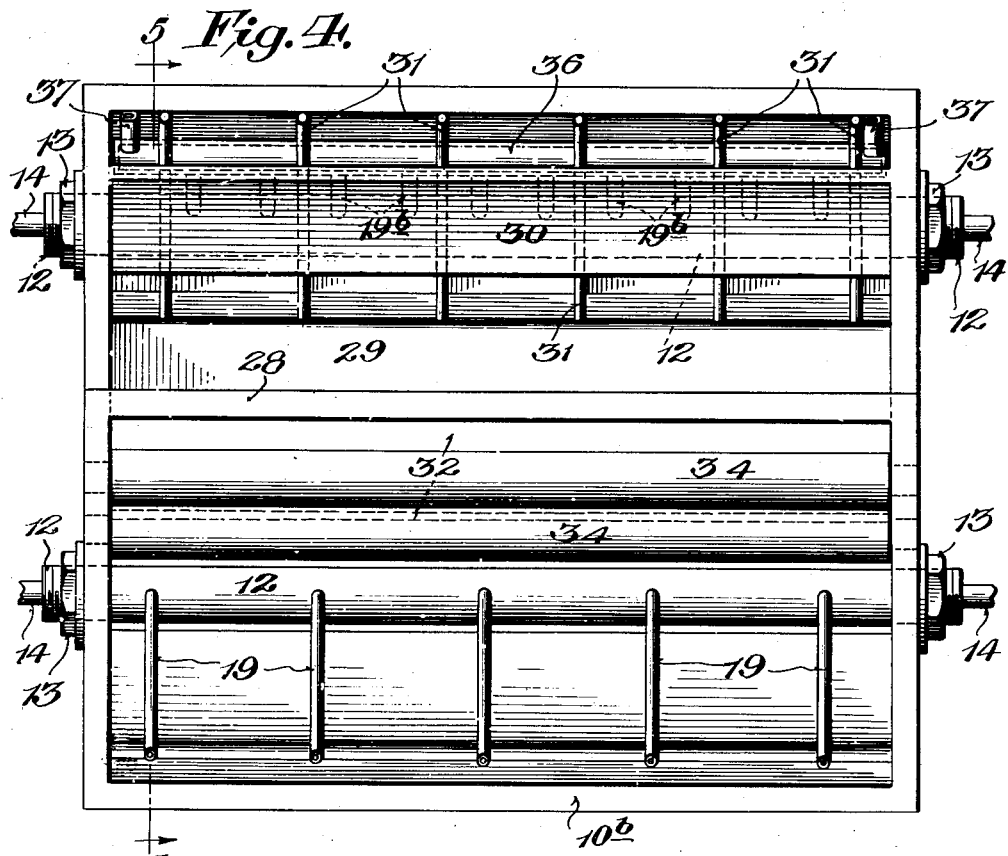
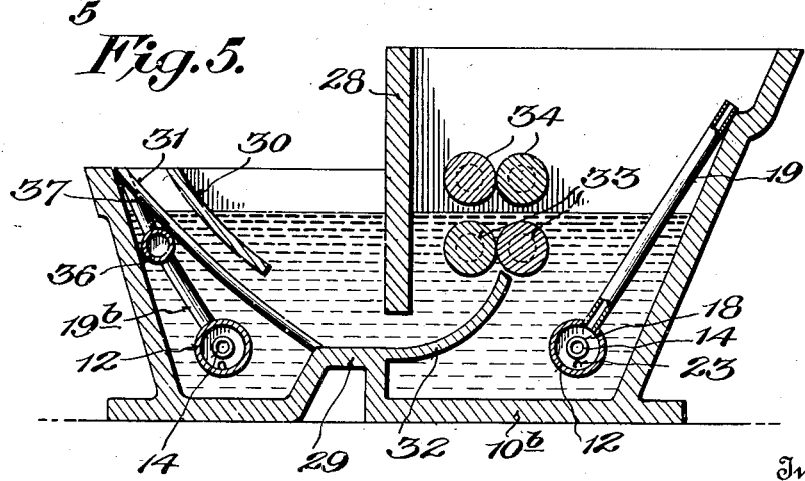

UNITED STATES PATENT OFFICE.

WILLIAM WALLACE KEMP AND WILLIAM H. VAN HORN, OF BALTIMORE, MARYLAND.

APPARATUS FOR AND METHOD OF HEATING METAL.

1,404,615.    Specification of Letters Patent.    Patented Jan. 24, 1922.

Application filed June 19, 1918. Serial No. 240,810.

*To all whom it may concern:*

Be it known that we, WILLIAM W. KEMP and WILLIAM H. VAN HORN, both citizens of the United States, residing at Baltimore, and State of Maryland, have invented new and useful Improvements in Apparatus for and Methods of Heating Metal, of which the following is a specification.

This invention relates to a method of heating fusible metals, and also to the apparatus for carrying the method into effect.

It has been the practice, generally, in melting and maintaining fusible metals in molten condition, to apply the heat or flame externally of the pot or receptacle containing the metal, but this practice is objectionable in that it is not economical, as a considerable part of the heat units are wasted in raising the temperature of the surrounding atmosphere when the flame is not confined, or heating the walls of the furnace when the flame is confined. This practice is further objectionable for the reason that, when the flame is applied to the external surface of the pot or receptacle containing fusible metal in a solid state, as, for instance, when the fire is started in the morning under a pot, the contents of which have cooled and solidified during the night, that portion of the fusible metal at the bottom of the pot is melted first and expands, and, the metal in the upper portion of the pot being still in a solid state, this force of expansion is exerted against the walls of the pot and cracking of the pot quite frequently results. Furthermore, after the apparatus has been in operation for some time, the pots become burned through, and also considerable difficulty is experienced in properly regulating the temperature of the fused metals.

Our invention has its main objects to provide a method of heating fusible metals, which is very efficient in operation in that it is economical, substantially all of the heat being employed to heat and maintain the fusible metal in a heated condition, and practically none of the heat being dissipated into the atmosphere before it is employed to heat the fusible metal; wherein danger of cracking or other injury to the pot or container during the melting operation is eliminated; the temperature of the fused metal may be regulated to a nicety, and wherein the products of combustion are employed to prevent oxidation of the fused metal.

It is also the purpose of our invention to provide an improved apparatus for practicing our method, which apparatus is very simple in construction; occupies but a relatively small space; may be readily installed in apparatuses now in use; may be readily adjusted to vary the degree of heat produced to suit varying conditions, and, generally, to provide a structure wherein our method may be readily and efficiently carried into effect.

In the following specification, we have described our method and apparatus as being employed for heating tinning and solder baths, but it is to be distinctly understood that the present disclosure is by way of illustration only and that our improvements may be practiced generally where easily fusible metals are to be melted. The present description is sufficiently illustrative to show the wide adaptability of our invention to various uses.

While we have illustrated the preferred embodiments of our apparatus, the same is susceptible to various modifications and changes and the method may be employed in other apparatuses than that herein shown and described.

In the accompanying drawings:

Figure 1 is a side elevational view of a soldering pot, to which our improvements are applied, the soldering pot in the present instance being the type employed for soldering the side seams of cans and the like.

Figure 2 is a sectional view taken substantially on line 2—2 of Figure 1.

Figure 3 is a sectional view through a tinning pot to which our invention is applied, the pot being used to tin wires.

Figure 4 is a top plan view of a machine for tinning plates and in which our invention is embodied.

Figure 5 is a sectional view taken on line 5—5, Figure 4.

In the said drawings, like reference characters represent like parts in the several views.

Referring to Figures 1 and 2, wherein is disclosed so much of a can soldering machine as is necessary to illustrate our invention, 10 designates a tank or pot containing the solder and which pot may be of any suitable construction. Rotatably mounted in bearings in the end walls of the pot 10 and extending longitudinally of the pot is a roller 11. It will be understood by those familiar with the art that in this type of machine the roller 11 which is partly immersed in the solder within the pot, is continuously rotated and the cans with the seams to be soldered engaging the roller, are moved longitudinally over the roller, so that the roller will wipe against the seams and deposit solder thereon. In the present instance we have not shown any means for rotating the roller 11 or feeding the cans thereover, as any suitable devices for these purposes may be employed and they are well known in the art.

Extending through the chamber of the pot 10, so as to lie within and be surrounded by the body of fusible material, is a fire tube 12, and, preferably, this tube is located beneath the roller 11. To prevent the fused metals from leaking out about the fire tube where it extends through the walls of the pot, stuffing boxes 13, of any desired form, are employed. Projecting into each end of the fire tube 12 is a burner 14 of any suitable construction, to which fuel is supplied by the pipes 15 each having a fire check 16 and a regulating and shut off valve 17. The burners 14 are maintained centrally of the fire tube 12 by means of the plugs 18.

The products of combustion are discharged from the fire tube 12 through vents or pipes 19 which pass upwardly from the tube 12 through the bath of molten metal to a point slightly above its surface. The vents 19 are preferably spaced apart throughout the length of the pot 10 so that the body of fusible material will be uniformly heated. To prevent the radiation of heat from the walls of the pot and its dissipation into the atmosphere the exterior surface of the pot is covered with a layer 20 of suitable heat insulating material. The pot 10 is provided with a cover 21 having in its opposite end walls openings 22 to accommodate the can feeding mechanism, (not shown).

The operation of the apparatus disclosed in Figures 1 and 2 will be readily understood. Any suitable fuel may be conveyed to the burners 14 by the pipe 15 but since, by preference, the ends of the burner tube 12 are substantially closed, the fuel should be such as to be self-sustaining and, as an example, we refer to a mixture of air and gas. When the burners 14 are lighted, the valves 17 having been turned to admit fuel thereto, flames are discharged into the fire tube 12 which cause the tube to be heated and the heat is conveyed through the walls of the tube to the surrounding fusible metal or solder. If desired, but one of the burners 14 may be employed, but preferably, both are used to obtain a more uniform distribution of the heat throughout the length of the pot. It is usual to feed the cans into one end of the pot 10 and in such instance it is desirable to apply a greater amount of heat to this end of the tube as the cold cans rapidly extract the heat from the end of this bath. This may be accomplished by admitting more fuel to the burner at the opposite end of the pot or tube. That is to say, if the cans are fed into the right hand end of the pot 10, referring to Figure 1, the burner 14 at the left hand end of the tube 12 would be supplied with a greater amount of fuel than the right hand burner. The left hand flame being injected under greater pressure into the tube, the heated product of combustion would be carried to the right hand and resulting in higher temperature at this end of the tube. The temperature of different portions of the bath may be regulated, also, by plugging some of the vents 19 in which case the products of combustion would pass through the remaining open vents and heat the solder around these vents to a higher degree. In Figure 2, I have shown a removable plug 35 in the end of vent 19. The temperature within the tube 12, and therefore, the temperature of the pot, may be easily regulated by turning the valves 17 to admit more or less fuel to either or both of the burners 14.

The products of combustion pass from the burner tube 14 through the vents 19 and as the latter are located within and surrounded by the solder or other fusible metal within the pot, the heat of the products of combustion is utilized in heating the molten material. It will be noted that since the burner tube 12 and the vent 19 are located within and surrounded by the fusible material and the flames are combined within the burner tube, the heat radiated from all portions of the walls of the tube 12 and the vents 19 is utilized in heating the metal, resulting in great economy and efficiency.

Upon ignition of the burner or burners 14, the solder within the pot being solid, all danger of cracking the pot, due to the expansion of the heated solder in the lower portions thereof, is eliminated, for the products of combustion on passing through the vents 19, will melt the metal surrounding the vents and the melted material about the burner tube 12, following the line of least resistance, would expand in a direction along the vents. It has been found in actual practice that the solder about the upper ends of the vents will be pushed above the surface of the solder in the bath, when the apparatus is set into operation.

It is well known that when fusible metals are heated in open pots, the metal becomes oxidized due to the contact of the surface of the metal with the oxygen of the atmosphere. To overcome this objection, we provide the cover 21 which aids in retaining the products of combustion issuing from the vents 19 immediately over the pot. The products of combustion are not of an oxidizing character and therefore the surface of the molten material is protected against oxidation.

Should some of the molten metal seep through the pores of the fire tube 12 or through the joints between the fire tube and the vents, we have provided a small hole 23 in one of the plugs 18 through which the metal, which may collect within the fire tube, can flow. To cause the molten metal within the tube 12 to flow toward and through this opening, the tube may be inclined at a slight angle.

In Figure 3 we have illustrated our improvements applied to an apparatus for tinning wire and in this apparatus, which is a well known construction, 10<sup>a</sup> designates a usual tinning tank, 24 designates a pair of rollers, each of which is located at the top of the tank and adjacent one edge thereof; 25 designates a row of feet, a foot being provided for each wire and each foot having a groove 26 through which a wire, shown in dotted lines, is adapted to slide, and 27 is a bar for supporting the feet 25.

As in the preceding figures, the fire tube 12 passes longitudinally through the tank 10<sup>a</sup> and has, at its opposite ends, burners 14, and spaced apart throughout the length of the tank are the vent tubes 19. A further description of this embodiment of our invention is not necessary as the construction of the heating device and operation thereof are identical to that illustrated in Figures 1 and 2.

In Figures 4 and 5 is illustrated a well known type of apparatus employed for tinning plates. The tank 10<sup>b</sup> is divided into compartments by the partition 28 and the internal rib 29. It will be readily understood by those familiar with the art that the plates to be coated are passed into the tank 10<sup>b</sup> between the partition 30 and the grid or rack 31, and are guided by the member 32 so that their forward edges are gripped between the rollers 33 which press the tin onto the surfaces of the plates. The plates are then passed between the rollers 34 which squeeze off of the plates the excess of the coating material. The surface of the bath of tin is located between the two sets of rollers 33 and 34. In accordance with our invention, the tank 10<sup>b</sup> is provided with two heating devices similar to that shown in the preceding figures for internally heating the metal bath. One of these fire tubes 12 is located adjacent the bottom of the tank in the plate receiving end thereof. The vents 19<sup>b</sup> leading from this fire tube, preferably, terminate at their upper ends in a manifold 36 extending across the front of the tank 10<sup>b</sup> and submerged in the molten metal immediately below the surface of the tin bath. The opposite open ends 37 of the manifold are bent upwardly and are located in the corners of the tank so that the products of combustion will be discharged without interfering with the operator. The ends 37 of the manifold are preferably, oblong in cross section so as to lie snugly against the wall of the tank and within the plane of the grid or rack 31 and not interfere with the insertion of the plates to be coated into the bath. The second fire tube or combustion chamber 12 is located in the delivery end of the tank and has the vents 19 spaced apart, as in Figures 1 and 2.

What we claim is:

1. The method of heating easily fusible metals which consists in maintaining a flame in a chamber within and entirely below the surface of the body of metal to be fused, leading the products of combustion through a plurality of vents upwardly through the body of metal to the surface thereof and discharging the products of combustion above the surface of the body of metal.

2. The method of heating fusible metals which consists in maintaining a flame to heat a body of fusible metal, leading the products of combustion upwardly through the metal to the surface thereof, and retaining the products of combustion above the surface of the metal.

3. The method of heating fusible metals which consists in maintaining a flame internally of a body of fusible metal, leading the products of combustion upwardly through the body of fusible metal, discharging the products of combustion at the surface of the metal, and retaining the products of combustion in contact with the surface of the metal.

4. An apparatus for heating fusible metals comprising a pot having a chamber containing the metal to be fused, a fire tube within the chamber of the pot and extending through the walls of the pot, a burner at each end of the fire tube and adapted to discharge a flame therein, and means for regulating the supply of fuel to said burners.

5. An apparatus for heating fusible metals comprising a chamber for containing a body of fusible metal, a combustion chamber extending longitudinally of the chamber and adapted to be surrounded by the body of fusible metal, and a vent leading from said combustion chamber and adapted to extend through the body of fusible metal to permit the products of combustion to aid in heating the fusible metal.

6. An apparatus for heating fusible metals, comprising a receptacle for the metal, a combustion chamber extending throughout the length of the receptacle and adapted to be surrounded by the metal therein, means for supplying heat to the combustion chamber, and a vent extending upward from the combustion chamber and adapted to take products of combustion above the metal in the receptacle.

7. An apparatus for heating fusible metals comprising a pot containing the fusible metals, a fire tube extending horizontally of the pot and located internally thereof so as to be surrounded by the fusible metal, a plurality of spaced apart vents leading from the fire tube upwardly through the body of fusible metal to the surface thereof, burners at opposite ends of the fire tube for discharging a flame therein, and means for regulating the supply of fuel to each of said burners.

8. An apparatus for heating fusible metals comprising a pot containing the metal, a combustion chamber for heating the metal, vents leading from the combustion chamber upwardly through the body of metal to the surface thereof, and a cover over the pot for retaining the products of combustion in contact with the surface of the metal.

9. An apparatus for heating fusible metals comprising a pot containing the metal, a combustion chamber located internally of the body of metal, means for supplying heat to the combustion chamber, a vent leading from the chamber upwardly through the body of metal to the surface thereof, and a cover over the pot.

10. An apparatus for heating fusible metals comprising a pot containing fusible metals, a fire tube within the chamber of the pot and extending through the walls of the pot, said tube having its ends substantially closed, a burner at each end of the tube for discharging a flame into the combustion chamber thereof, means for regulating the supply of fuel to the burners, and a plurality of spaced apart vents leading from the fire tube upwardly through the metal to the surface thereof.

11. In an apparatus for heating fusible metals, the combination with a receptacle for the metal, of a combustion chamber arranged within the receptacle in position to be completely covered by the body of metal therein, and a vent extending from said chamber above the level of metal in the receptacle.

12. In an apparatus for heating fusible metals, the combination with a receptacle for the metal, of a combustion chamber arranged near the bottom of the receptacle and provided with an upwardly extending vent of greater length than the depth of the body of metal to be placed in the receptacle, whereby the chamber will be submerged in and the vent surrounded by said metal.

13. In an apparatus of the character described, the combination with a receptacle for fusible metal, and a roll extending above and below the level of the body of metal to be placed in the receptacle, of a combustion chamber arranged within the receptacle in a plane below the axis of said roll and having a vent extending upwardly to a plane above the level of metal in the receptacle.

In testimony whereof we have hereunto set our hands.

WILLIAM WALLACE KEMP.
WILLIAM H. VAN HORN.